US012619409B2

(12) United States Patent
Ballard et al.

(10) Patent No.: US 12,619,409 B2
(45) Date of Patent: May 5, 2026

(54) SYSTEMS AND METHODS FOR EAGER SOFTWARE BUILD

(71) Applicant: Apple Inc., Cupertino, CA (US)

(72) Inventors: Richard Ballard, San Francisco, CA (US); Daniel Dunbar, San Francisco, CA (US); Matthew Moriarity, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/376,731

(22) Filed: Apr. 5, 2019

(65) Prior Publication Data

US 2020/0319867 A1 Oct. 8, 2020

(51) Int. Cl.
| | |
|---|---|
| *G06F 8/41* | (2018.01) |
| *G06F 8/20* | (2018.01) |
| *G06F 8/36* | (2018.01) |
| *G06F 16/901* | (2019.01) |

(52) U.S. Cl.
CPC ............... G06F 8/456 (2013.01); G06F 8/24 (2013.01); G06F 8/36 (2013.01); G06F 8/433 (2013.01); G06F 16/9024 (2019.01)

(58) Field of Classification Search
CPC ........ G06F 8/456; G06F 16/9024; G06F 8/24; G06F 8/36; G06F 8/433
USPC ........................................................ 717/149
See application file for complete search history.

(56) References Cited

U.S. PATENT DOCUMENTS

| | | | |
|---|---|---|---|
| 7,069,555 B1 * | 6/2006 | Tzen ........................ | G06F 8/445 |
| | | | 712/212 |
| 7,877,738 B2 * | 1/2011 | Goldstein ................. | G06F 8/48 |
| | | | 717/140 |
| 8,789,031 B2 * | 7/2014 | Liu .......................... | G06F 8/433 |
| | | | 717/154 |
| 9,043,582 B2 * | 5/2015 | Larin ................... | G06F 9/30043 |
| | | | 712/214 |
| 9,887,878 B2 | 2/2018 | Mahajan et al. | |
| 10,007,674 B2 | 6/2018 | Fink et al. | |

(Continued)

*Primary Examiner* — Thuy Dao
*Assistant Examiner* — Zengpu Wei
(74) *Attorney, Agent, or Firm* — FIG. 1 Patents

(57) ABSTRACT

A method and apparatus of a device that builds a target using a plurality of processing units is described. In an exemplary embodiment, the device receives a build file for the target, where the build file identifies a plurality of dependencies and the first target is depended on a second target. In addition, the device generates a directed acyclic graph for the first target from the plurality of dependencies. Furthermore, the device transforms the directed acyclic graph by transforming the first set of dependencies to a second set of dependencies and the second set of dependency includes the first dependency that is from a first node in the first target to a second node of a second target. The device additionally identifies a plurality of independent executable tasks, where each of the plurality of independent executable tasks is executable without an unresolved dependency and at least one of the plurality of executable tasks is associated with the second set of dependencies of the transformed directed acyclic graph. The device further schedules the plurality of independent executable tasks on the plurality of processing units. In addition, the device concurrently executes the plurality of independent executable tasks.

18 Claims, 9 Drawing Sheets

(56)        References Cited

U.S. PATENT DOCUMENTS

| | | | | |
|---|---|---|---|---|
| 2002/0056078 | A1* | 5/2002 | Inagaki | G06F 8/445 |
| | | | | 717/155 |
| 2004/0261064 | A1* | 12/2004 | Goldstein | G06F 8/48 |
| | | | | 717/140 |
| 2007/0094650 | A1* | 4/2007 | Klein | G06F 8/433 |
| | | | | 717/151 |
| 2009/0077360 | A1* | 3/2009 | Liu | G06F 8/433 |
| | | | | 712/233 |
| 2014/0082330 | A1* | 3/2014 | Larin | G06F 8/433 |
| | | | | 712/214 |
| 2015/0172412 | A1 | 6/2015 | Escriva et al. | |
| 2017/0249235 | A1* | 8/2017 | Staples | G06F 11/3688 |
| 2018/0081652 | A1* | 3/2018 | Ahmed | G06F 16/9024 |
| 2018/0307528 | A1* | 10/2018 | Ahmed | G06F 9/4881 |

* cited by examiner

1000

SYSTEMS AND METHODS FOR EAGER SOFTWARE BUILD

FIELD OF INVENTION

This invention relates generally to compilation technology and more particularly to identifying and executing build tasks.

BACKGROUND OF THE INVENTION

In software development, a developer can use a build automation tool to build executable programs and libraries. Each of the executable programs and/or libraries can be dependent on other entities, such as source files, object files, other libraries, etc. For example, the tasks that make up building a target (e.g., an application, framework, or library) can be grouped into a target. Furthermore, one target can be dependent on another target. If target A depends on target B, the build system must wait for every task that goes into building target B to finish before any tasks for target A can begin.

This makes for a simple model, but it limits opportunities for parallelism in the build. Certainly not every task in target A requires B to be completely built, linked, and post-processed.

SUMMARY OF THE DESCRIPTION

A method and apparatus of a device that builds a target using a plurality of processing units is described. In an exemplary embodiment, the device receives a build file for the first target, where the build file identifies a plurality of dependencies and the first target is depended on a second target. In addition, the device generates a directed acyclic graph for the first target from the plurality of dependencies. Furthermore, the device transforms the directed acyclic graph by transforming the first set of dependencies to a second set of dependencies and the second set of dependency includes a first dependency that is from a first node in the first target to a second node of a second target. The device additionally identifies a plurality of independent executable tasks, where each of the plurality of independent executable tasks is executable without an unresolved dependency and at least one of the plurality of executable tasks is associated with the second set of dependencies of the transformed directed acyclic graph. The device further schedules the plurality of independent executable tasks on the plurality of processing units. In addition, the device executes the plurality of independent executable tasks.

In a further embodiment, a task is selected from the group consisting of compilation, linking, copying headers, copying frameworks, generating debugging information, and code signing. In addition, a directed acyclic graph includes nodes and edges, wherein each node is one of a task node, and gate node, and each edge couples a task node with a gate node. Furthermore, the task node represents a set of one or more tasks. Additionally, a target is selected from the group consisting of an application, framework, plurality of applications, library, and an operating system.

In another embodiment, the device removes and/or adds a second dependency in the directed acyclic graph. The device further identifies a compilation task in the first target and a copy task in the second target. The device additionally creates the first dependency between the compilation task and the copy task. In addition, the device removes the third dependency between the compilation task and another task in the first target. Furthermore, the plurality of independent executable tasks includes an immediate task, wherein the immediate task is a task represented in the untransformed directed acyclic graph with a dependency but can be run without this dependency being completed. The immediate task can be one of creating a framework directory structure, creating an application directory structure, writing header maps, copying a standard library, copying a stub binary for certain an application programming interface kit, and writing a module maps.

In one embodiment, a machine-readable medium having executable instructions to cause one or more processing units to perform a method to build a target using a plurality of processing units is described. In an exemplary embodiment, the machine-readable medium method receives a build file for the first target, where the build file identifies a first set of dependencies and the first target is depended on a second target. In addition, the machine-readable medium method generates a directed acyclic graph for the first target from the first set of dependencies. Furthermore, the machine-readable medium method transforms the directed acyclic graph by transforming the first set of dependencies to a second set of dependencies and the second set of dependency includes a first dependency is from a first node in the first target to a second node of a second target. The machine-readable medium method additionally identifies a plurality of independent executable tasks, where each of the plurality of independent executable tasks is executable without an unresolved dependency and at least one of the plurality of executable tasks is associated with the second set of dependencies of the transformed directed acyclic graph. The machine-readable medium method further schedules the plurality of independent executable tasks on the plurality of processing units. In addition, the machine-readable medium method executes the plurality of independent executable tasks.

In one embodiment, a method to build a first target using a plurality of processing units is described. In an exemplary embodiment, the method receives a build file for the first target, where the build file identifies a first set of dependencies and the first target is depended on a second target. In addition, the method generates a directed acyclic graph for the first target from the first of dependencies. Furthermore, the method transforms the directed acyclic graph by transforming the first set of dependencies to a second set of dependencies and the second set of dependency includes a first dependency is from a first node in the first target to a second node of a second target. The method additionally identifies a plurality of independent executable tasks, where each of the plurality of independent executable tasks is executable without an unresolved dependency and at least one of the plurality of independent executable tasks is associated with the second set dependencies of the transformed directed acyclic graph. The method further schedules the plurality of independent executable tasks on the plurality of processing units. In addition, the method executes the plurality of independent executable tasks.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
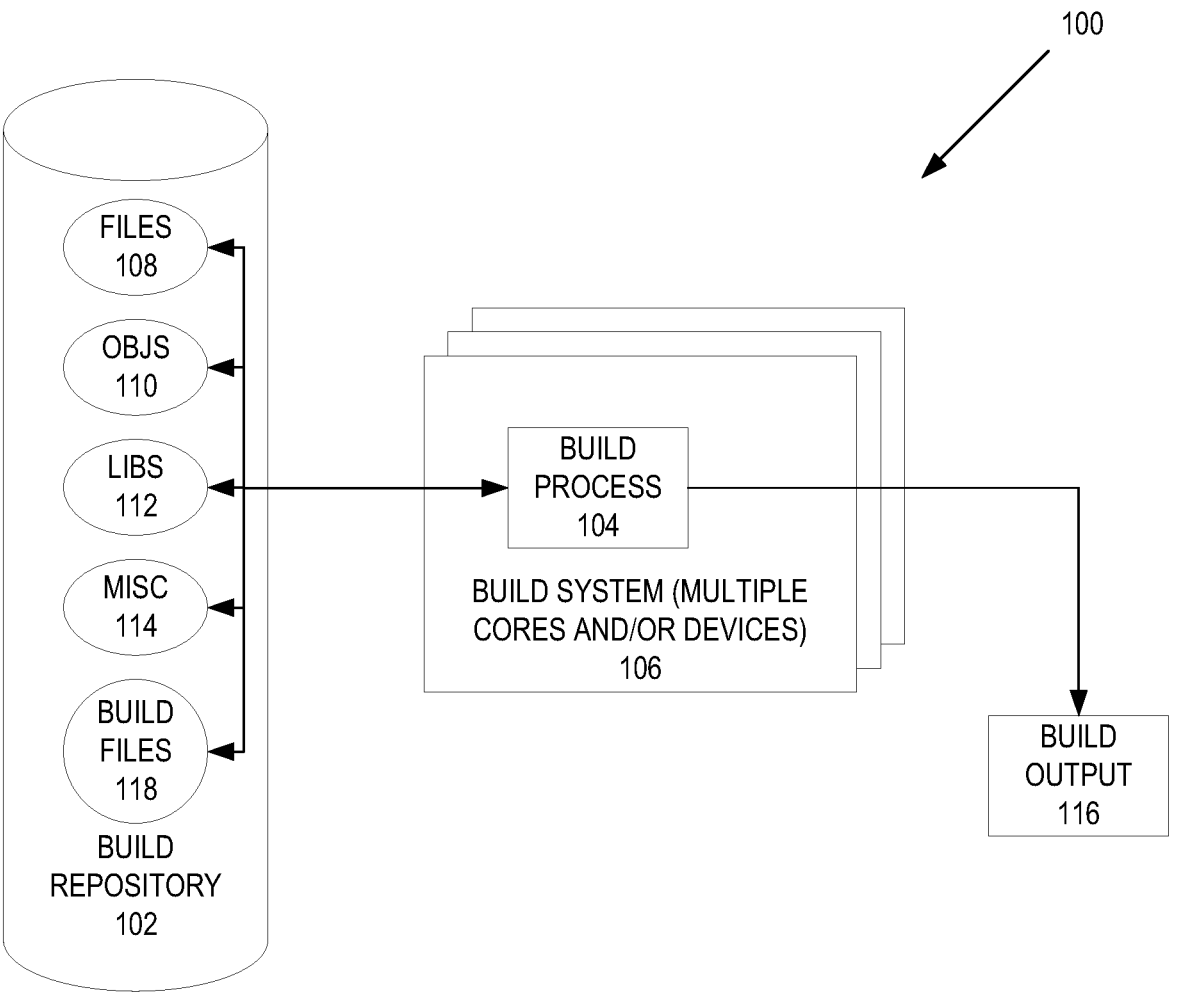
FIG. 1 is a block diagram of one embodiment of a system for building a target using a build process.

A method and apparatus of a device that builds a target using a plurality of processing units is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that builds a target using a plurality of processing units is described. In one embodiment, the device receives a build file and determines a directed acyclic graph (DAG) for the target(s) that are included in the build file. In one embodiment, the build file is a set of one or more files that includes information on how to build a target that is defined in the build file. This information is used by a build process to determine the tasks that are needed to be run so as to build the target. In this embodiment, the build file defines a set of dependencies between the different components that are used by the build process to build the target.

In one embodiment, the build process generates the DAG from the build file, where the DAG is a collection of task nodes and gate nodes, and each edge in the DAG represents a dependency between a task node and a gate node. In one embodiment, the gate node is an artificial barrier for a set of tasks in the build process. For example and in one embodiment, the gates in the DAG indicates how the build phases within a target (e.g., run script, copy files, compile sources, and/or other build phases) are made to run in the sequence listed in the build file. One problem with this DAG, is that the tasks in the DAG can be run in a serial fashion because of the dependencies represented in the DAG.

In one embodiment, the build process can use a set of rules to reduce the dependencies. In this embodiment, one rule is that a compilation of a source is dependent on source being ready to compile and not on other tasks (e.g., library linking, debug symbol generation, library/framework copying, and/or code signing). In one embodiment, what a compilation task actually needs from its dependencies in order to be able to safely execute is: headers; module maps; and/or other modules (e.g., Swift modules). In another embodiment, the build process can be identify some tasks that can be run immediately, possibly from the very start of the build, even if these tasks do not require input from the targets dependencies. Some examples of tasks that can be run immediately include: creating a framework or application directory structure, writing header maps, copying standard libraries (e.g., Swift standard libraries), copying stub binaries for certain applications or application programming interface kits, and/or writing module maps. In this embodiment, these tasks represent work that does not need anything from the targets dependencies to be able to execute. Thus, these tasks can be run at any time including well before the corresponding target actually builds them.

In a further embodiment, the build process can transform the DAG by deleting some gates and adding new types of gates, such as began compiling and module ready gates. The begin compiling gate is a gate that indicates that the target can begin compiling and the module ready gate indicates that the task has completed executing and that task(s) downstream that depend on this task can be begin. In one embodiment, utilizing these rules can allow more tasks to be run in a parallel fashion and make use of available processing units.

FIG. 1 is a block diagram of one embodiment of a system 100 for building a target using a build process. In FIG. 1, system 100 includes a build repository 102, build system 106, and build output 116. In one embodiment, the build system 106 uses files objects and/or other entities stored in the build repository 102 to create the build output 116. In this embodiment, the build system 106 is a system with multiple processing units and/or multiple devices that can include one or more processing units. For example and in one embodiment, the build system 106 is a single device with multiple processing units. By having multiple processing units, the build system 106 can run different tasks on the different processing units concurrently, and thus improve on the amount of time it takes for the build system 106 to build the output 116. Alternatively, the build system can be a set of multiple devices, were each device has one or more processing units. In this example, the build system 106 can be a group of devices that can be used to concurrently perform the tasks needed to build the output 116. In one embodiment, each processing unit can be a central processing unit (CPU) with one or more processing cores. Alternatively, the processing unit can be a set of multiple CPUs with one or more processing cores, and/or another type of processing unit (e.g., a graphics processing unit (GPU)).

In one embodiment, the build system 106 builds the build output 116 using a build process 104 and the files, etc., stored in the build repository 102. In one embodiment, the build repository 102 includes files 108, objects 110, libraries 112, miscellaneous 114, and build files 118. In this embodiment, the files 108 can be files that are used for compilation, such as source files, headers, scripts, assets (e.g., image, video, audio, data files, and/or other types of assets), and/or other types of files used in compilation. In addition, an object 110 is an object file containing object code which is a relocatable format machine code that is usually not directly executable. An object file may further contain metadata that is used for linking, such as: debugging including information to resolve symbolic cross-references between different modules, relocation information, stack unwinding information, comments, program symbols, debugging, profiling information, and/or other types of metadata. Furthermore, a library is a file that is intended to be shared by executable files and further shared object files. Libraries 112 can be statically linked or dynamically linked. In one embodiment, miscellaneous 114 includes modules, executables, resources, and/or other types of data used by the build system. In a further embodiment, the build repository 102 includes build files 118. In one embodiment, a build file 118 includes information on how to build the output 116. This information is used by the build process 104 to determine the tasks that are needed to be run so as to build the output 116. In this embodiment, the build file 118 defines a set of dependencies between the different components that are used by the build process 104 to build the output 116. For example and in one embodiment, if the build output 116 is an application, and the application depends on a library or framework to be built prior to the application being built, the build file 118 may include information that indicates that the application build target is dependent on the library or framework build target being completed first. Furthermore, the build output 116 can have one or more other types of dependencies. For example and in one embodiment, an application can be dependent on source files, header files, libraries, and/or other types of files objects or components that are required to be built before the application is built. As another example and embodiment, a set of applications can be dependent on source files, headers, other applications, libraries, frameworks, and/or other types of dependencies.

As described above, and in one embodiment, the build process 104 reads the build files 114 to determine what types of tasks need to be executed so as to build the output 116. In one embodiment, one type of tasks that can be generated by the build process 104 can be copy files, which copies files, such as header or framework files, to a proper directory. In this embodiment, some compilations require that certain components, such as header or framework files, to be located in a certain directory or subdirectory. Other types of tasks that may be generated by the build process can include compilation, linking, preprocessing, generating symbol information such as debug information, code signing, and/or other types of tasks that are useful in building an output 116. With these different sets of tasks, the build process 104 can schedule and execute these tasks such that the output 116 is built.

In one embodiment, a problem can occur because many of the tasks generated by the build process 104 are dependent on other tasks being completed, which causes delays in running some or all of the remaining tasks. For example and in one embodiment, a linking task needs to wait for the corresponding compilation tasks to be completed. As another example, compilation tasks will need the proper files in the proper directories before these compilation tasks can be executed. With this number of dependencies in the build process 104, it is hard to parallelize the remaining tasks in the build process 104, so as to make efficient use of the available processing units. For example and in one embodiment, in a purely serialized build scheme where each task in the set of tasks is dependent on a prior task being completed, only one processing unit can be effectively used at a time.

Figure 2:
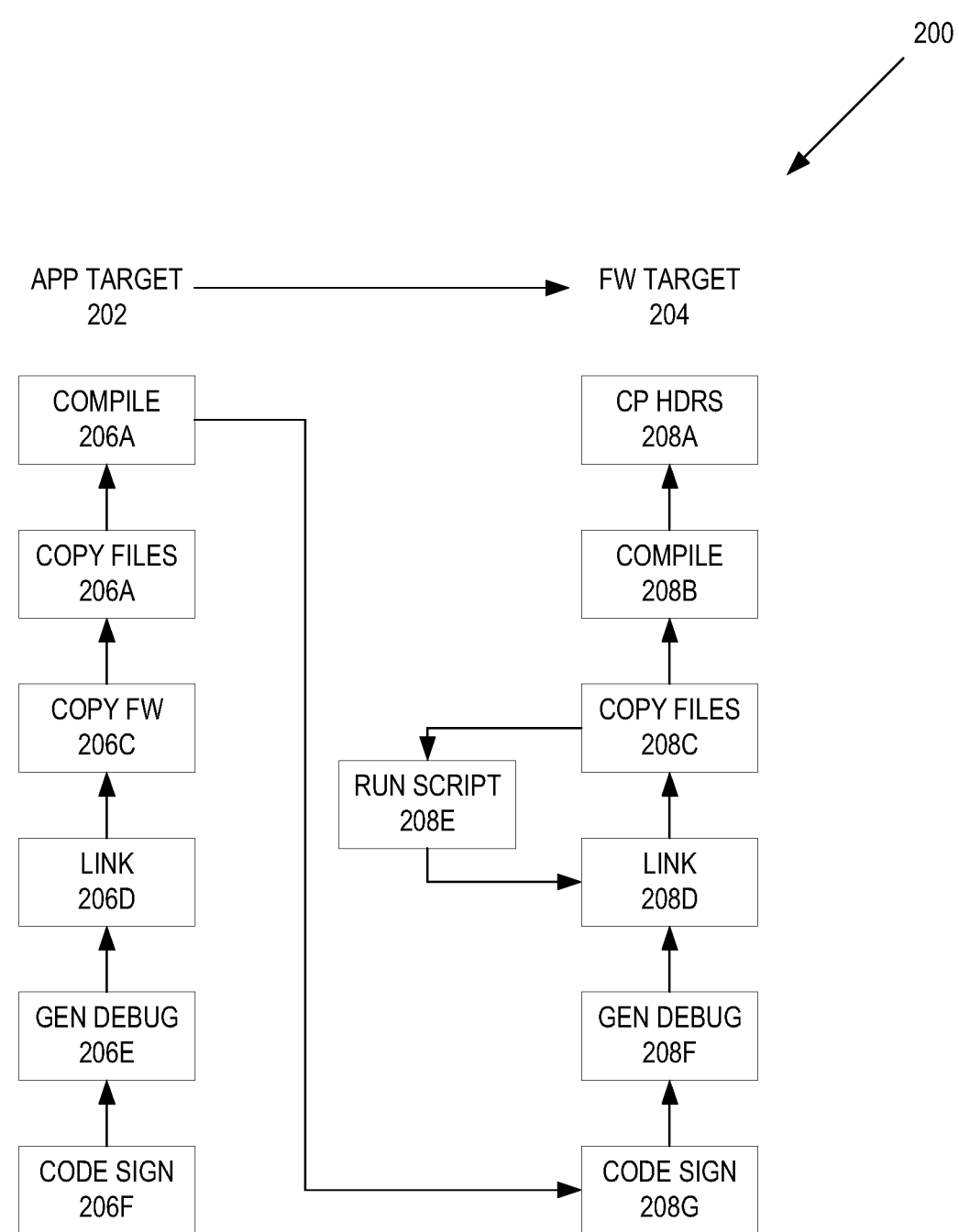
FIG. 2 is an illustration of one embodiment of a system of dependencies for application and framework targets.

FIG. 2 is an illustration of one embodiment of a system 200 of dependencies for application and framework targets. In FIG. 2, an application can target 202 is dependent on a framework target 204. This means, in one embodiment, that the framework 204 needs to be fully built before the set of tasks 206A-F for the application target are started. In one embodiment, to build the framework target 204, a number of tasks 208A-G need to be executed. In one embodiment, to build the framework target 204, the tasks 208A-G are executed sequentially, where one task cannot be commenced until its dependent task(s) are completed. For example and in one embodiment, the task 208A of copying the headers is the first task for the framework target 204. As described above, the copy headers task copies the header source files to a proper directory. The compile task 208B compiles the source files into objects using the headers. The compile task 208B can be executed once the copy headers task 208A is completed. The next task, copy files task 208C, copies the resource files and/or other files into the proper location such that these resources files and/or other files can further be processed and/or used. The copy files task 208C is dependent on the completion of the compile task 208B. Next in the list of tasks, is the link task 2086D, which links the objects and/or other libraries to create an executable. The link task 208D is dependent on the copy files task 208C. Another task to be run, the run script task 208E, is a task that runs an arbitrary script. This run script task 208E is dependent on the copy files task 208C. Furthermore, the link task 208D can be dependent on the run script task 208E. The generate debug information task 208F is a task that generates the debug symbol information for the executable created by the link task 208D. The generate debug information task 208F is dependent on the link task 208D. The last task in this example for the framework target 204 is the code signing task 208G. The code signing task signs the code such that the developer for this code is known. The code signing task 208G is dependent on the generate debug information task 208F. As illustrated in FIG. 2, once the code signed task 208G is completed, the first of the application target 202 tasks can be started.

In one embodiment, the application target 202 includes the set of tasks 206A-F. The initial task for the application target 202 set of tasks 206A-F is the compile task 206A. The compile task 206A compiles the application source files into objects using the headers generated in the framework target 204 for task copy headers 208A. The copy files task 206B copies resource files and can optionally process these files. The copy files task 206B is dependent on the compilation task 206A. The next task, the copy frameworks task 206C, copies the framework files to the proper location for the application target 202. This task is dependent on the copy files task 206B. In one embodiment, with the framework files in the proper location and the objects generated for the application target 202, link task 206D can be executed, which links the object files (and using the framework files), into an executable. This link task 206D is dependent on the copy frameworks task 206C. The generate debug information task 206E generates debug information. The generate information task 206E is dependent on the linked task 206D. The final task for the application target 202 is the code signing task 206F, which signs the code for the application such that the developer for this code is known.

Figure 3:
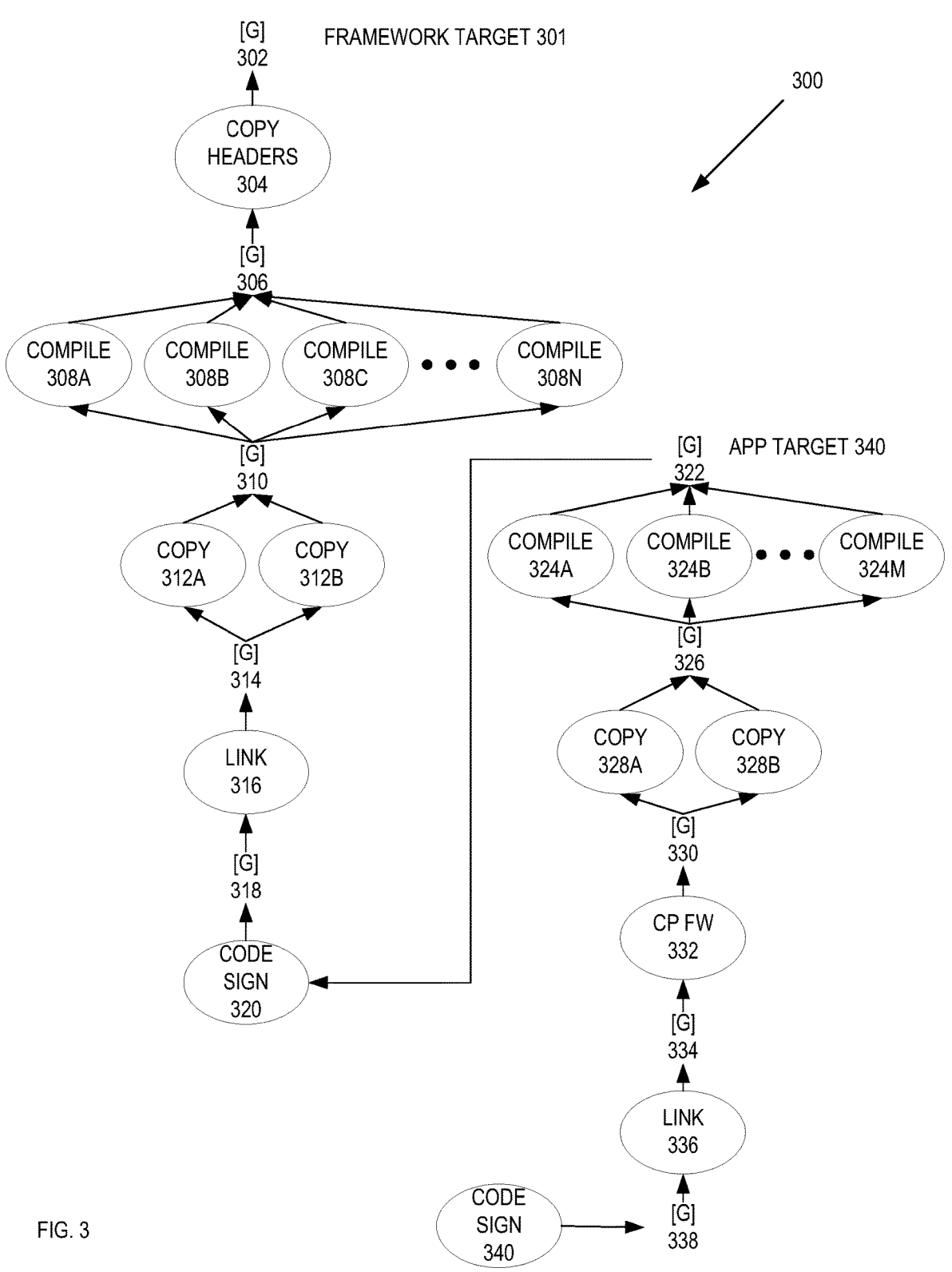
FIG. 3 is an illustration of one embodiment of a directed acyclic graph of fine-grained dependencies for application and framework targets.

FIG. 3 is an illustration of one embodiment of a directed acyclic graph 300 of fine-grained dependencies for application and framework targets. In FIG. 3, the directed acyclic graph (DAG) 300 is a DAG of tasks for an application target build, where the application target 340 is dependent on a framework target 301 being built. In one embodiment, the set of tasks for the application target 340 is dependent on the set of tasks for the framework target 301 being executed and completed. In this embodiment, this dependency causes the task execution for the application target 340 set of tasks to be done serially, and this can be inefficient in making use of multiple processing units that may be available. In one embodiment, the DAG 300 is a collection of task nodes and gate nodes ("[G]"), where each edge in the DAG 300 represents a dependency between a task node and a gate node. In one embodiment, the gate node is an artificial barrier for a set of tasks in the build process. For example and in one embodiment, the gates in the DAG 300 is how the build phases within a target (e.g., run script, copy files, compile sources, and/or other build phases) are made to run in the sequence listed in the build file. In addition, this is how the tasks for targets are grouped together. Each target has a gate at the beginning and end, and dependencies are linked by wiring the end gate of one target to the start gate of another target. In this embodiment, each task in a target would depend on the start task for its target, and the end task for target would depend on every other task in the target.

In one embodiment, the framework target 301 has an initial gate 302 that is the start gate for the copy headers 304 task. The end gate 306 for the copy headers task 304 is also the start gate 306 for the set of compilation tasks 308A-N. The set of compilation tasks 308A-N has an end gate 310 which is also the start gate for the set of copy tasks 312A-B. The set of copy tasks 312A-B has an end gate 314, which is also the start gate 314 for the linking task 316. Furthermore, the linking task has an end gate 318 which is also the start gate for the code signing task 320. In one embodiment, the code signing task 320 is the last task for the framework target 301.

In one embodiment, the initial gate 322 for the application target 340 is used to start off the tasks for the application target. This gate 322 is the start gate for the set of compilation tasks 324A-M for the application target 340. The set of compilation tasks 324A-M has an end gate 326, which is also the start gate 326 for the set of copy tasks 328A-B. The end gate 330 for the set of copy tasks 328A-B is also the start gate for the copy frameworks task 332. The copy frameworks task 332 has an end gate 334 that is also the start gate for the linking task 336. The end gate 338 for the linking task 336 is also the start gate 338 for the code signing task 340. In one embodiment, the code signing task 340 is the last task for the application target 340, where the application is built at the completion of this code signing task 340. In one embodiment, the copy headers task 304, compilation tasks 308A-N, copy tasks 312A-B, linking task 316, and code signing task 320 are the same or similar tasks for the frameworks target 301 as described in FIG. 2 above. In another embodiment, the compilation tasks 324A-M, copy tasks 328A-B, copy frameworks task 332, linking task 336, and code signing task 340 are the same or similar tasks for the application target 340 as described in FIG. 2 above.

For similar reasons described above with reference to FIG. 2, a problem with this DAG 300 is that the generated dependencies with the application target 340 are dependent on the framework target 301. This can create too many dependencies for the individual tasks. For example and in one embodiment, one or more of the compilation tasks 324A-M for the application target 340 can be started once the headers are in the proper directory location. Thus, in this example, once the copy headers task 304 is completed, any of the compilation tasks 308A-N or 324A-M can be started and executed. In one embodiment, this idea can be generalized into an assumption that compilation tasks do not depend on linked binaries. Indeed, what a compilation task actually needs from its dependencies in order to be able to safely execute is: headers; module maps; and/or other modules (e.g., Swift modules). Thus, with the necessary headers, module maps, and/or other modules needed for compilation in the proper location, a compilation task can be started. This compilation task can be started even though a DAG for a target build indicates that there are several other dependencies for this compilation task (e.g., linking tasks, code signing tasks, copying tasks, and/or other tasks) that can be one or more targets deep in this target build DAG. In addition, and in another embodiment, the build process can identify some tasks that can be run immediately, possibly from the very start of the build, even if these tasks do not require input from the targets dependencies. Some examples of tasks that can be run immediately include: creating a framework or application directory structure, writing header maps, copying standard libraries (e.g., Swift standard libraries), copying stub binaries for certain applications or application programming interface kits, and/or writing module maps. In this embodiment, these tasks represent work that does not need anything from the targets dependencies to be able to execute. Thus, these tasks can be run at any time including well before the corresponding target actually builds them.

Figure 4:
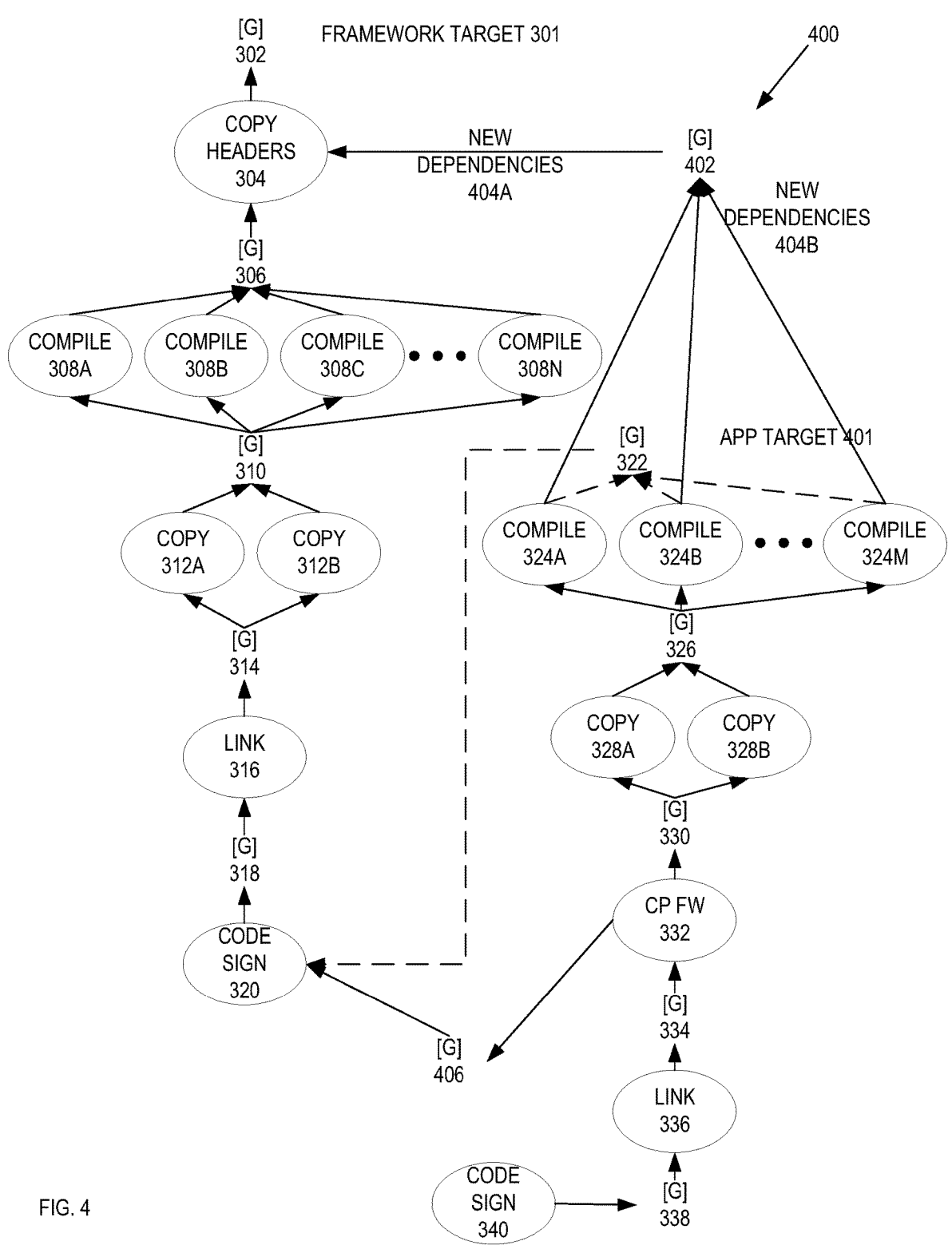
FIG. 4 is an illustration of one embodiment of a transformed directed acyclic graph of fine-grained dependencies for application and framework targets.

In one embodiment, in addition to the start and ending gates for each task in the DAG 300, a parallel pair of gates can be added, such as a gate that indicates the target can begin compiling, and another gate that indicates that the target is done building the pieces that downstream compilation tasks will need. These are the begin compiling and modules ready gates, respectively. With these gates added to a DAG, certain tasks can ignore the target beginning gate and use these new gates to control the flow of execution for the build. FIG. 4 is an illustration of one embodiment of a transformed directed acyclic graph of fine-grained dependencies for application and framework targets.

In FIG. 4, a DAG 400 is illustrated of an application target 401 that is dependent on a framework target 301. In one embodiment, the framework target 301 is similar to the framework target 301 as illustrated in FIG. 3 above. In this embodiment, the framework target 301 has an initial gate 302 that is the start gate for the task copy headers 304. The end gate 306 for the copy headers task 304 is also the start gate 306 for the set of compilation tasks 308A-N. The set of compilation tasks 308A-N has an end gate 310 which is also the start gate for the set of copy tasks 312A-B. The set of copy tasks 312A-B has an end gate 314, which is also the start gate 314 for the linking task 316. Furthermore, the linking task has an end gate 318 which is also the start gate for the code signing task 320. In one embodiment, the code signing task 320 is the last task for the framework target 301. In one embodiment, the gates for the framework target 301 are start and end gates as described above.

As described above, in addition to the start and end gates, a begin compilation gate can be added to the DAG such that the compilation tasks 324A-M of the application target 400 can be executed once the copy headers task 304 in the frameworks target 301 is completed. In one embodiment, this can be accomplished by restructuring the DAG 400 in such a way that the start gate 322 is deleted and the begin compilation gate 402 is added. In this embodiment, the begin compilation gate 402 is a new gate added to the DAG 400 that is dependent on the copy headers task 304. In addition, the compilation tasks 324A-M are dependent on the begin compilation gate 402 by way of the new dependencies 404A-B being added to the DAG 400. By adding this new gate 402, and deleting the old gate 322, the compilation tasks 324A-M can be executed earlier in the DAG 400 and can also be executed concurrently with the other compilation tasks 308A-N. This leads to, in one embodiment, an increased parallelization of the compilation tasks and can make use of the available processing units which leads to an increased efficiency of the build device and how the build devices are utilized. By using most or all of the available processing units in the build device(s), the throughput for building the application target is increased and allows for faster turnaround in generating the application itself. While in one embodiment, the DAG 400 is illustrated for building an application that is dependent on a framework, in alternate embodiments, a different DAG can be constructed for more complicated types of targets (e.g. a set of multiple applications, and application that is dependent on multiple frameworks, a complicated suite of targets such as an operating system, and/or other types of compli-cated target).

In another example, the begin compilation gate can be added to the DAG such that compilation tasks 324A-M of the application target 401 can be executed once the copy headers 304 in the framework target 301 is completed. In one embodiment, this can be accomplished by restructuring the DAG 400 in such a way that the start gate 322 is deleted and a begin compilation gate 402 is added linking the compilation tasks 308A-M with the copy headers task 304. In this embodiment, the begin compilation gate 402 is a new gate added to the DAG 400 that is dependent on the copy headers task 304. In addition, the compilation tasks 324A-M are dependent on the new begin compilation gate 402 by way of the new dependencies being added to the DAG 400. By adding this new gate, and deleting the old gate 322, the compilation tasks 324A-M can be executed earlier in the DAG 400. This can lead to, in one embodiment, an increased parallelization of the compilation tasks and can make use of the available processing units which leads to an increased efficiency of the build device and how the build devices are utilized.

In one embodiment, the rest of the DAG 400 for the application target 401 is as described in FIG. 3 above, with one exception. For example and in one embodiment, the end gate 330 for the set of copy tasks 328A-B is also the start gate for the copy frameworks task 332. The copy frame-works task 332 has an end gate 334 that is also the start gate for the linking task 336. The end gate 338 for the linking task 336 is also the start gate 338 for the code signing task 340. In one embodiment, the code signing task 340 is the last task for the application target 340, where the application is built at the completion of this code signing task 340.

In one embodiment, the copy frameworks task 332 is also dependent on a new gate 406 that links a dependency to the code sign 320. In this embodiment, the copy frameworks task 332 may fail if this task is executed before or at the same time as the code sign task 332. Thus, in this embodi-ment, the new gate 406 is added that delays the execution of the copy frameworks task 332 until the completion of the code sign task 320.

For example and in one embodiment, for a given project, the build time is decreased by 15% (or more). In this example, executing the build process using the original DAG, causes a longer build time because the tasks for the build using this DAG include dependencies result in an overly serial build order. As a result, some tasks are sched-uled to execute later in the build sequence and, thus, cause an inefficient allocation of processing resources. In another example, by using the transformed DAG 400, the use of the processing resources can be more efficiently allocated as more tasks are available for execution earlier in the build sequence. This allows for tasks to be scheduled for available processing units earlier in the build sequence instead of potentially having idled processing units during this time. Therefore, by using the transformed DAG for scheduling task, the build process decreases the amount of idle times of the processing units for the same set of tasks.

In a further embodiment, the DAG 400 may introduce other new dependencies and remove existing dependencies not illustrated here. In this embodiment, the removal of the existing dependencies allow for an increased parallelization.

In one embodiment, the tasks that the build process generates can also have ordering options, which is just a set of flags that indicates how the tasks should be connected to the four gates mentioned above and to be executed at the correct point in the build. In this embodiment, without any options, a task behaves like it always has, executing between the beginning and ending target. In one embodiment, there are two options that can cause a task to opt out of that type of behavior. One option is a compilation requirement option. This option suggests that this task does the work that needs to happen before targets that depend on this one can start compiling their sources. This includes installing module maps, copying headers, and, compiling sources. In another embodiment, this option can also be added to any task for executing shell scripts, since the consequences of these shell scripts are not entirely known. In one embodiment, the build process can make a conservative assumption that the work of the shell scripts is important and should wait for the shell scripts to complete. Another option is compilation. The compilation option marks all tasks that want to be opt in to running eagerly. In this embodiment, these tasks will be able to run once all the compilation requirements from depen-dencies are complete. This, of course, includes a compile source tasks but it also can include several set up tasks for the target, since these are prerequisites for compilation. Another option is an immediate run task option. This option marks any task that can run as soon as the bill begins, regardless of when other tasks in their target are run. Types of immediate run tasks can include: creating the framework or application directory structure; writing header maps, copying standard libraries; copying stubbed binaries for certain types of applications; and/or writing module maps.

In one embodiment, there are additional optimizations that can be made to go along with this type of task identification. In one embodiment, how immediate tasks are handled can further be optimized. In this embodiment, the goal of allowing a task to be able to be run immediately from the start of the build was so that these immediate tasks could act as a filler throughout the build, running at times when there are idle processing units but no other available tasks for the targets that are currently building. In this embodiment, the immediate tasks are clumped up at the start of the build when there are plenty of more urgent tasks run. This can lead to a poor performance gain. In one embodiment, urgent tasks can be given higher priorities that allow a task scheduler to run the urgent tasks preferentially over filler tasks. In one embodiment, the build process could walk the target graph and assign priorities to each target based on the depth in the graph. In this embodiment, all tasks for a target would inherit the priority of the target. The build task scheduler would use the priorities for scheduling the available tasks for execution. In one embodiment, the build process can use a priority queue to schedule build task for execution. In one embodiment, by assigning priorities to the different tasks, tasks with the highest priority would be run preferentially over tasks with lower priority. The lower priority tasks would be executed when there is available time on the processing units that are allocated for the build process.

In one embodiment, the user specifies a coarse-grained set of dependencies in one or more build configuration files. For example, and in one embodiment, the coarse-grained dependencies can be one that application A is dependent on frameworks B and C, and library D. In another example, the user can specify a coarse-grained set of instructions that can be a sequence of coarse-grained tasks for each target. In this example, the coarse-grained sequence of tasks can be copy headers, compile, copy files, link, generated debug information, and code signing. In a further example, the coarse-grained sequence of tasks can be the tasks outlined in the FIG. 2 above. In one embodiment, by having the user input the coarse-grained set of dependencies and/or sequence of coarse-grained tasks, the maintenance of these sets of instructions is easier for the user and decreases the chance for an input error.

Figure 5:
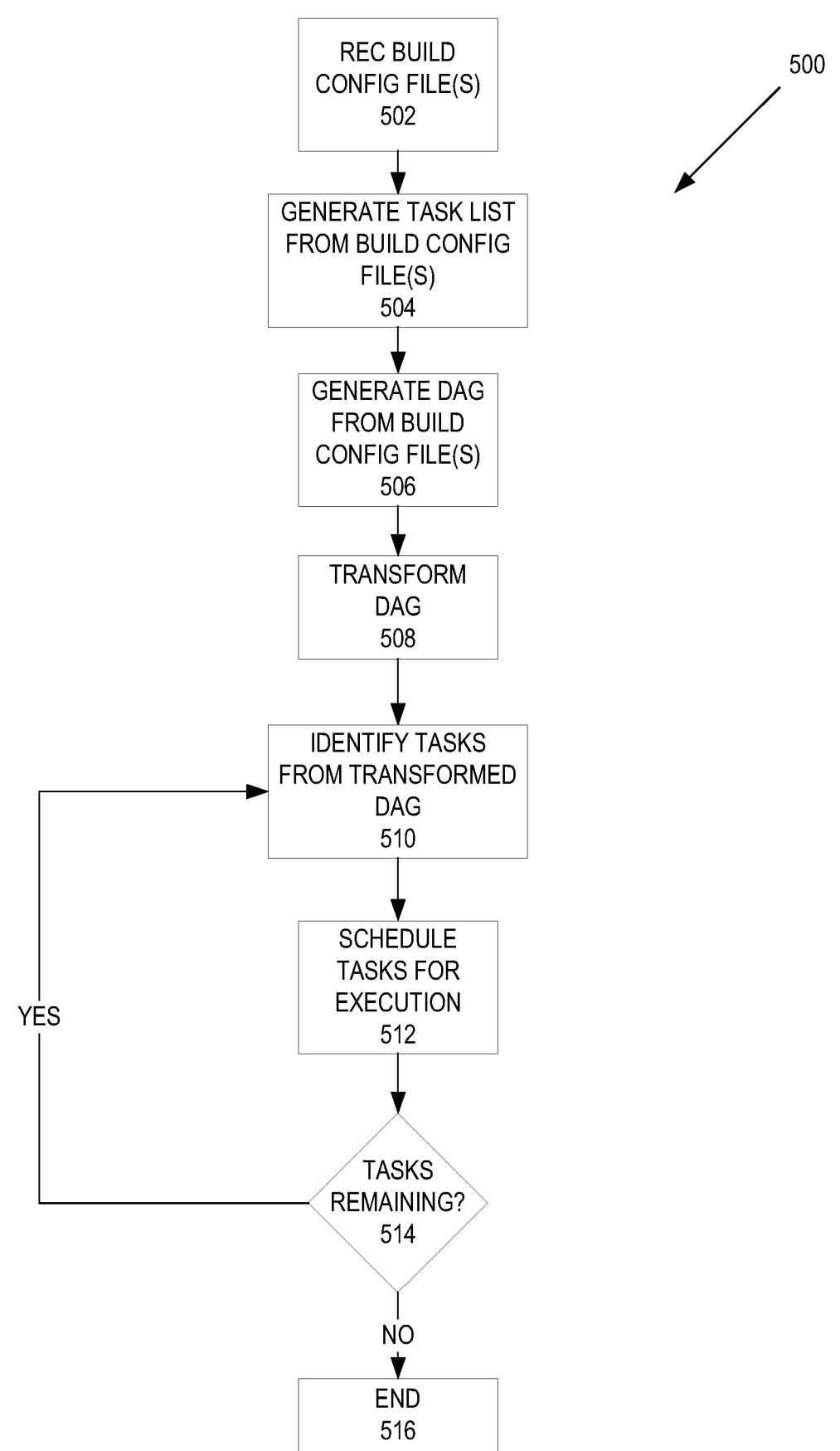
FIG. 5 is a flow diagram of one embodiment of a process to build a target.

As described above, the build process can identify tasks that can be run earlier than initial DAG would suggest. In one embodiment, the build process can restructure the DAG such that old dependencies are broken and new dependencies are created that allows tasks that are deeper in the DAG to be scheduled and executed earlier in the build process. FIG. 5 is flow diagram of one embodiment of a process to build a target. In FIG. 5, process 500 begins by receiving the build files at block 502. In one embodiment, the build files are a set of one or more files that identify the components that are used as input to the build process (e.g., source files, header files, libraries, and/or other types of input for build process), identify the targets to be built, and the dependencies between the different targets. At block 504, process 500 generates a DAG from the build files. In one embodiment, process 500 generates a DAG from the build files such as the DAG 300 as illustrated in FIG. 3. Process 500 transforms the DAG at block 506. In one embodiment, process 500 transforms the DAG by deleting unnecessary dependencies in the DAG and adding new dependencies that allows certain tasks identified in the DAG to be scheduled and executed earlier in the build process sequence. For example and in one embodiment, process 500 can add new types of gates, such as the begin compiling gate and/or modules ready gate that allow compilation tasks and/or other types of tasks to be executed earlier in the build process sequence.

At block 508, process 500 identifies tasks from the transformed DAG. In one embodiment, identifying the set of tasks as further described in FIG. 6 below. Process 500 schedules these identified tasks for execution at block 510. At block 512, process 500 determines if the target is reached. In one embodiment, process 500 determines that the dependent target in the build process is reached, were build process can have one or more and targets. If the target is not reached, execution proceeds to block 508 above. If the target is reached, process 500 ends at block 514.

Figure 6:
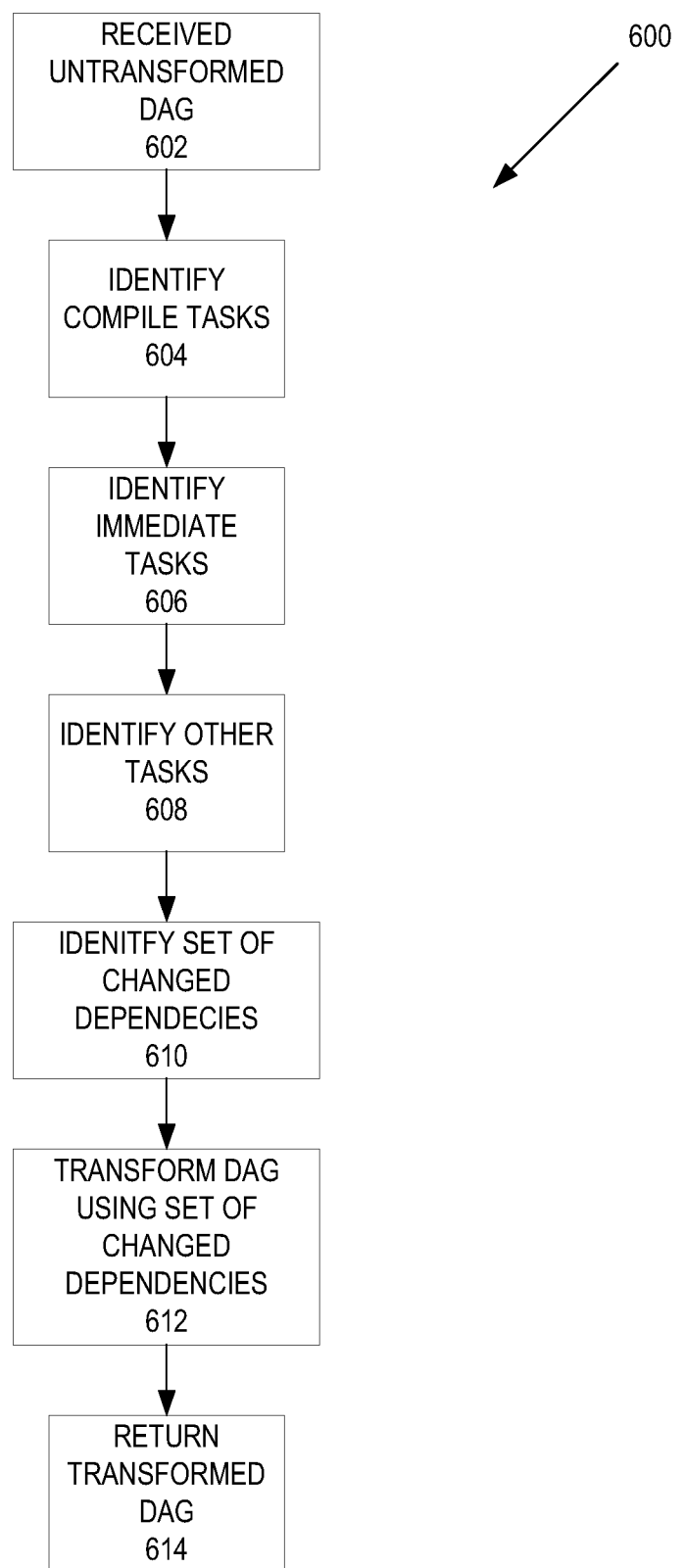
FIG. 6 is a flow diagram of one embodiment of a process to transform a directed acyclic graph.

FIG. 6 is a flow diagram of one embodiment of a process to transform a DAG. In FIG. 6, process 600 receives the untransformed DAG at block 602. At block 604, process 600 identifies runnable compilation tasks. In one embodiment, runnable compilation tasks are compilation tasks where the corresponding dependencies have been satisfied. For example and in one embodiment, a set of compilation tasks for an application or framework target or runnable if the dependent copy headers task has completed. At block 606, process 600 identifies immediate tasks. In one embodiment, immediate task can be: creating the framework or application directory structure; writing header maps, copying standard libraries; copying stubbed binaries for certain types of applications; and/or writing module maps. Process 600 identifies other tasks at block 608. In one embodiment, the other tasks are other types of tasks that may not formally depend on the dependency for this task as represented in the untransformed DAG. At block 610, process 600 identifies the set of changed dependencies using the tasks identified in blocks 604, 606, and 608. In one embodiment, for each compilation task in block 604, process 600 determines if a dependency can be changed to a copy type task found in a dependent target. In this embodiment, process 600 can delete the current dependency for this compilation task and add a new dependency to the copy type task found in the dependent target. In another embodiment, for each immediate task identified in block 606, process removes the dependency for that immediate task. By removing the dependency, this immediate task can be scheduled and executed at any time. Process 600 generates the transformed DAG using this set of changed dependencies block 612.

Figure 7:
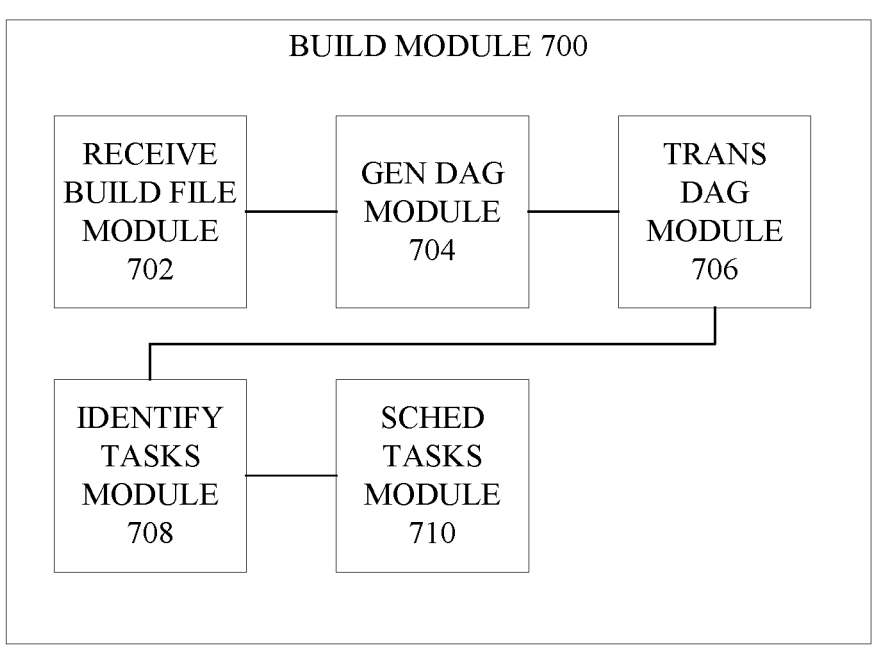
FIG. 7 is a block diagram of one embodiment of a build module that builds a target.

FIG. 7 is a block diagram of one embodiment of build module 700 that builds a target. In FIG. 7, build module 700 includes receive build file 702, generate DAG module 704, transform DAG module 706, identify tasks module 708, and schedule tasks module 710. In one embodiment, the receive build file 702 receives the build file as described in FIG. 5, block 502. The generate DAG module 704 generates the DAG as described in FIG. 5, block 504. The transform DAG module 706 transform the DAG as described in FIG. 5, block 506. The identify tasks module 708 identifies the runnable tasks as described in FIG. 5, block 508. The schedule tasks module 710 schedules the tasks as described in FIG. 5, block 510.

Figure 8:
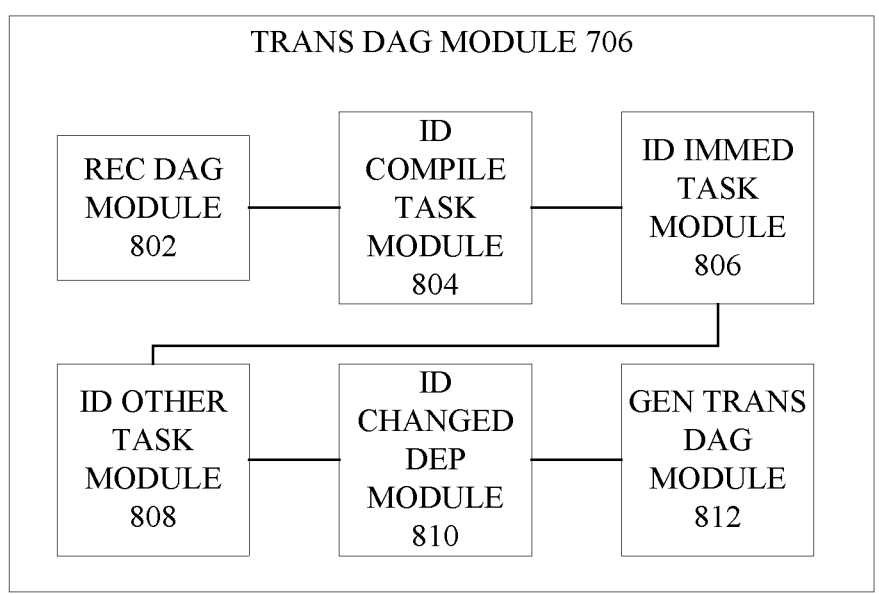
FIG. 8 is a block diagram of one embodiment of a transform DAG module that transforms a directed acyclic graph.

FIG. 8 is a block diagram of one embodiment of identify tasks module that determines a set of runnable tasks. In FIG. 8, the trans DAG nodule 706 includes a receive DAG module 802, identify compilation task module 804, identify immediate task module 806, identify other task module 808, identify changed dependencies module 810, and generate transformed DAG module 812. In one embodiment, the receive DAG module 802 receives the untransformed DAG as described in FIG. 6, block 602 above. The identify compilation task module 804 identifies compilation tasks as described in FIG. 6, block 604 above. The identify immediate task module 806 identifies immediate tasks as described in FIG. 6, block 606 above. The identify other task module 808 identifies other types of task as described in FIG. 6, block 608 above. The identify changed dependencies module 810 identifies the set of changed dependencies as described in FIG. 6, block 610 above. The generate transformed DAG module 812 generates the transformed DAG as described in FIG. 6, block 612 above.

Figure 9:
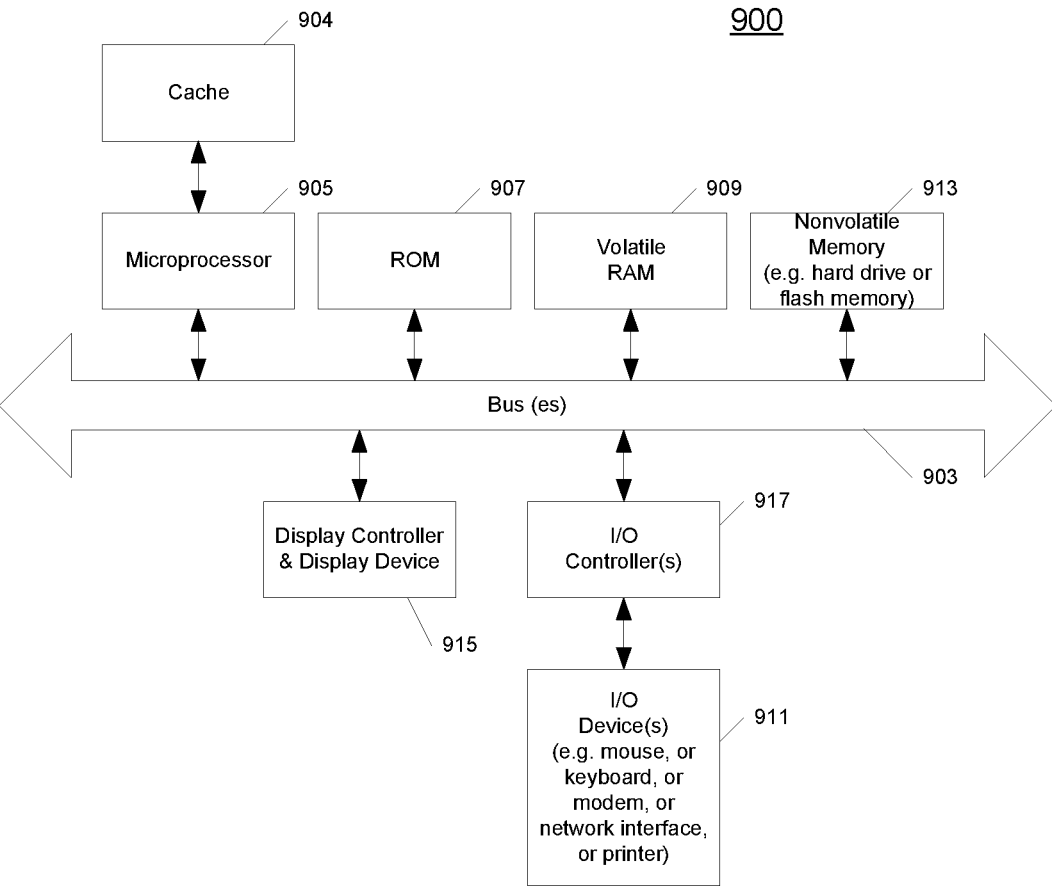
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a build system 106 as shown in FIG. 1 above. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may include one or more CPU(s), GPU(s), a specialized processor, and/or a combination thereof. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 919 and to peripheral devices such as input/output (I/O) devices which may be mice, keyboards, modems, network interfaces, printers and other devices which are well known in the art. Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD RAM or a flash memory or other types of memory systems, which maintain data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
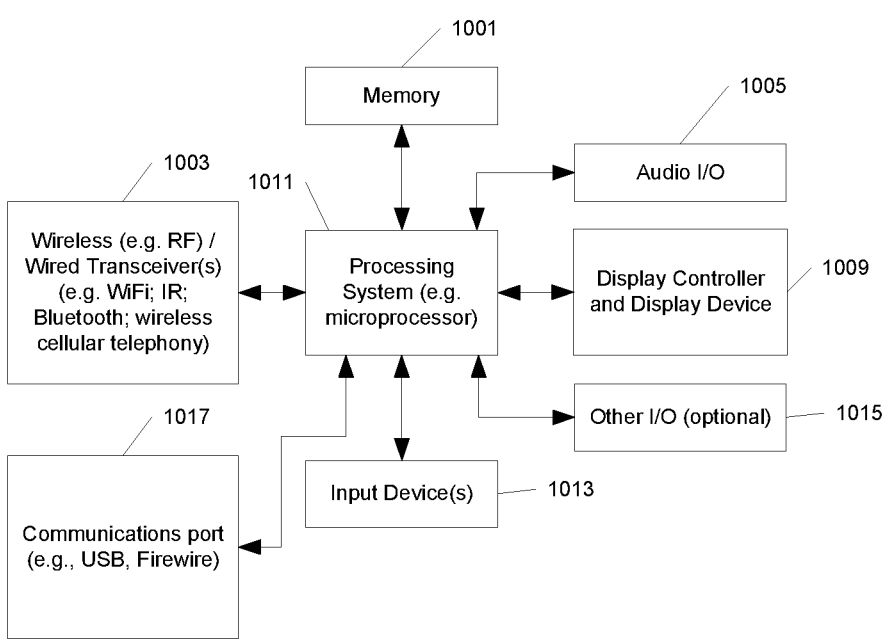
FIG. 10 shows an example of a data processing system, which may be used with one embodiment of the present invention.

FIG. 10 shows an example of another data processing system 1000 which may be used with one embodiment of the present invention. For example, system 1000 may be implemented as a build system 106 as shown in FIG. 1 above. The data processing system 1000 shown in FIG. 10 includes a processing system 1011, which may be one or more microprocessors, or which may be a system on a chip integrated circuit, and the system also includes memory 1001 for storing data and programs for execution by the processing system. The system 1000 also includes an audio input/output subsystem 1005, which may include a microphone and a speaker for, for example, playing back music or providing telephone functionality through the speaker and microphone.

A display controller and display device 1009 provide a visual user interface for the user; this digital interface may include a graphical user interface which is similar to that shown on a Macintosh computer when running OS X operating system software, or Apple iPhone when running the iOS operating system, etc. The system 1000 also includes one or more wireless transceivers 1003 to communicate with another data processing system, such as the system 1000 of FIG. 10. A wireless transceiver may be a WLAN transceiver, an infrared transceiver, a Bluetooth transceiver, and/or a wireless cellular telephony transceiver. It will be appreciated that additional components, not shown, may also be part of the system 1000 in certain embodiments, and in certain embodiments fewer components than shown in FIG. 10 may also be used in a data processing system. The system 1000 further includes one or more communications ports 1017 to communicate with another data processing system, such as the system 900 of FIG. 9. The communications port may be a USB port, Firewire port, Bluetooth interface, etc.

The data processing system 1000 also includes one or more input devices 1013, which are provided to allow a user to provide input to the system. These input devices may be a keypad or a keyboard or a touch panel or a multi touch panel. The data processing system 1000 also includes an optional input/output device 1015 which may be a connector for a dock. It will be appreciated that one or more buses, not shown, may be used to interconnect the various components as is well known in the art. The data processing system shown in FIG. 10 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1000 may be a network computer or an embedded processing device within another device, or other types of data processing systems, which have fewer components or perhaps more components than that shown in FIG. 10.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, CA, a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transforming," "identifying," "receiving," "scheduling," "executing," "creating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to build a first target using a plurality of processing units, the method comprising:

receiving a build file for the first target, wherein the build file identifies a first set of task dependencies and the first target is dependent on a second target;

generating a directed acyclic graph for the first target from the first set of task dependencies;

transforming the directed acyclic graph by identifying an immediate task in the first target, wherein the immediate task is a task represented in an untransformed directed acyclic graph with a task dependency but is run without the task dependency being completed, and transforming the first set of task dependencies to a second set of task dependencies and the second set of task dependencies includes a first task dependency that is from a first node representing the immediate task in the first target to a second node of the second target;

identifying a plurality of independent executable tasks using at least the transformed directed acyclic graph, wherein each of the plurality of independent executable tasks is executable without an unresolved task dependency, at least one of the plurality of independent executable tasks is associated with the second set of task dependencies of the transformed directed acyclic graph, the transformed directed acyclic graph has a greater number of concurrently executable paths that each include one or more of the independent executable tasks than the untransformed directed acyclic graph, and the second set of task dependencies of the transformed directed acyclic graph has a reduced number of task dependencies than in the first set of task dependencies;

scheduling the plurality of independent executable tasks on the plurality of processing units; and executing the plurality of independent executable tasks.

2. The non-transitory machine readable medium of claim 1, wherein a task is selected from the group consisting of compilation, linking, copying headers, copying frameworks, generating debugging information, and code signing.

3. The non-transitory machine readable medium of claim 1, wherein the directed acyclic graph includes nodes and edges, wherein each node is one of a task node, and a gate node, and each edge couples a task node with a gate node.

4. The non-transitory machine readable medium of claim 1, wherein a task node represents a set of one or more tasks.

5. The non-transitory machine readable medium of claim 4, wherein the first target is selected from the group consisting of an application, framework, plurality of applications, library, and an operating system.

6. The non-transitory machine readable medium of claim 1, wherein the transforming of the first set of task dependencies comprises:

removing a second task dependency in the directed acyclic graph.

7. The non-transitory machine readable medium of claim 1, wherein the transforming of the first set of task dependencies comprises:

identifying a compilation task in the first target;

identifying a copy task in the second target;

creating the first task dependency between the compilation task and the copy task; and removing the second task dependency between the compilation task and another task in the first target.

8. The non-transitory machine readable medium of claim 1, wherein the transforming of the first set of task dependencies comprises:

adding a second task dependency in the directed acyclic graph.

9. The non-transitory machine readable medium of claim 1, wherein the immediate task is selected from the group consisting of creating a framework directory structure, creating an application directory structure, writing header maps, copying a standard library, copying a stub binary for a certain application programming interface kit, and writing a module maps.

10. A method to build a first target using a plurality of processing units, the method comprising:

receiving a build file for the first target, wherein the build file identifies a first set of task dependencies and the first target is dependent on a second target;

generating a directed acyclic graph for the first target from the first set of task dependencies;

transforming the directed acyclic graph by identifying an immediate task in the first target, wherein the immediate task is a task represented in an untransformed directed acyclic graph with a task dependency but is run without the task dependency being completed, and transforming the first set of task dependencies to a second set of task dependencies and the second set of task dependencies includes a first task dependency that is from a first node representing the immediate task in the first target to a second node of the second target;

identifying a plurality of independent executable tasks using at least the transformed directed acyclic graph, wherein each of the plurality of independent executable tasks is executable without an unresolved task dependency, at least one of the plurality of independent executable tasks is associated with the second set of task dependencies of the transformed directed acyclic graph, the transformed directed acyclic graph has a greater number of concurrently executable paths that each include one or more of the independent executable tasks than the untransformed directed acyclic graph, and the second set of task dependencies of the transformed directed acyclic graph has a reduced number of task dependencies than in the first set of task dependencies;

scheduling the plurality of independent executable tasks on the plurality of processing units; and executing the plurality of independent executable tasks.

11. The method of claim 10, wherein a task is selected from the group consisting of compilation, linking, copying headers, copying frameworks, generating debugging information, and code signing.

12. The method of claim 10, wherein the directed acyclic graph includes nodes and edges, wherein each node is one of a task node, and a gate node, and each edge couples a task node with a gate node.

13. The method of claim 12, wherein the first target is selected from the group consisting of an application, framework, plurality of applications, library, and an operating system.

14. The method of claim 10, wherein the transforming of the first set of task dependencies comprises:

removing a second task dependency in the directed acyclic graph.

15. The method of claim 14, wherein the transforming of the first set of task dependencies comprises:

identifying a compilation task in the first target;

identifying a copy task in the second target;

creating the task dependency between the compilation task and the copy task; and removing a task dependency between the compilation task and another task in the first target.

16. The method of claim 10, wherein the transforming of the first set of task dependencies comprises:

adding a second task dependency in the directed acyclic graph.

17. The method of claim 10, wherein the immediate task is selected from the group consisting of creating a framework directory structure, creating an application directory structure, writing header maps, copying a standard library, copying a stub binary for a certain application programming interface kit, and writing a module maps.

18. A device that builds a first target, the device comprising:

at least one processor;

a memory coupled to the at least one processor through a bus; and a process executed from memory by the processor that causes the processor to receive a build file for the first target, wherein the build file identifies a first set of task dependencies and the first target is dependent on a second target, generate a directed acyclic graph for the first target from the first set of task dependencies, transform the directed acyclic graph by identifying an immediate task in the first target, wherein the immediate task is a task represented in an untransformed directed acyclic graph with a task dependency but is run without the task dependency being completed and transform the first set of task dependencies to a second set of task dependencies and the second set of task dependencies includes an additional task dependency that is from a first node representing the immediate task in the first target to a second node of the second target, identify a plurality of independent executable tasks using at least the transformed directed acyclic graph, wherein each of the plurality of independent executable tasks is executable without an unresolved task dependency and at least one of the plurality of independent executable tasks is associated with the second set of task dependencies of the transformed directed acyclic graph, the transformed directed acyclic graph has a greater number of concurrently executable paths that each include one or more of the independent executable tasks than the untransformed directed acyclic graph, and the second set of task dependencies of the transformed directed acyclic graph has a reduced number of dependencies than in the first set of dependencies, and schedule the plurality of independent executable tasks on the plurality of processors, and execute the plurality of independent executable tasks.

* * * * *